United States Patent
Yamazaki

(10) Patent No.: US 6,834,760 B2
(45) Date of Patent: Dec. 28, 2004

(54) DEFORMED CONVEYING BELT

(75) Inventor: Takaya Yamazaki, Wakayama (JP)

(73) Assignee: Habasit AG, Reinach (CH)

( * ) Notice: Subject to any disclaimer, the term of this patent is extended or adjusted under 35 U.S.C. 154(b) by 0 days.

(21) Appl. No.: 10/312,773

(22) PCT Filed: Jun. 11, 2001

(86) PCT No.: PCT/EP01/06570

§ 371 (c)(1),
(2), (4) Date: Jun. 12, 2003

(87) PCT Pub. No.: WO02/04323

PCT Pub. Date: Jan. 17, 2002

(65) Prior Publication Data

US 2004/0079622 A1 Apr. 29, 2004

(30) Foreign Application Priority Data

Jul. 7, 2000 (JP) .................................... 2000-207394

(51) Int. Cl.⁷ ............................................ B65G 15/02
(52) U.S. Cl. ..................................... 198/831; 198/847
(58) Field of Search ................................. 198/831, 847

(56) References Cited

U.S. PATENT DOCUMENTS 4,955,466 A    9/1990  Almes et al. ............... 198/831
5,360,102 A  * 11/1994  Schoning .................... 198/831
5,394,977 A  *  3/1995  Cline ......................... 198/831

FOREIGN PATENT DOCUMENTS

EP    0 716 034    6/1996
EP    1 129 966    9/2001

* cited by examiner

Primary Examiner—James R. Bidwell
(74) Attorney, Agent, or Firm—Hodgson Russ LLP

(57) ABSTRACT

A deformed conveying belt (20) comprises a resin moulding (22) fixed on a conveying belt (21). The resin moulding (22) comprises a body (22a) being welded, etc. onto the conveying belt (21) and a contacting part (22b) being made of a resin of which hardness is greater than that of the body (22a) and being combined with the surface of the body (22a) to contact an article. When the resin moulding (22) of this deformed conveying belt (20) is subjected to bending forces, as the body (22a) is formed of a resin of low hardness and has high flexibility, the resin moulding (22) will be prevented from being damaged by deformation. When the resin moulding (22b) is formed of a resin of which hardness is higher than that of the body (22a) and has high wear resistance, the resin moulding (22) will be prevented from being damaged by wear.

8 Claims, 5 Drawing Sheets (a)

(b)

(a)

(b)

DEFORMED CONVEYING BELT

TECHNICAL FIELD OF THE INVENTION

The present invention belongs to the technical field of conveying belts and relates to a deformed conveying belt comprising a conveying belt and a resin moulding fixed to the conveying belt.

PRIOR ART

A curved conveyor is known wherein its conveying surface is curved when seen in a plane. This curved conveyor comprises two conical or truncated-conical or cylindrical rollers rotating on approximately horizontal axes and being arranged at an angle to each other when seen in a plane and a conveying belt being formed into an umbrella with a hole opened in the center thereof and being put on the two rollers, and the curved conveyor has an approximately semi-circular conveying surface. In the present context the umbrella is a shape formed by a conical slope. In this curved conveyor, due to its construction, the conveying belt is subjected to a force that pulls the conveying belt towards its inner circumference. Hence, as shown in FIG. 8, a resin moulding 102, of which section is a U toppled sidewise, is fitted on the entire length of the outer circumference rim of the conveying belt 101, and guide rollers 103, 104 are made to press against a thicker part which is formed on the inner circumference side of the resin moulding 102 to receive the tensile force acting on the conveying belt 101.

Another conveyor is known wherein a conveying belt is put on two rollers, resin mouldings which extend in the width direction are provided as crossarms on the conveying surface of the conveying belt at approximately constant intervals in the longitudinal direction thereof, and products being placed on the conveying surface are pushed by these crossarms to be conveyed.

Problems to be Solved by the Invention

A requirement common to deformed conveying belts comprising a conveying belt and a resin moulding or resin mouldings fixed on the belt is that the resin moulding or mouldings should be flexible. The reason for this is as follows. When the deformed conveying belt moves over a roller, the resin moulding or mouldings will be subjected to bending forces. If the resin moulding lacks flexibility, for example, the resin moulding will suffer cracks and eventually break up. In particular, when the diameter of the roller is reduced for compactification, the bending force will get larger and the resin moulding will be required to have a higher flexibility. In the case of a deformed conveying belt for a curved conveyor, as a resin moulding, which is formed straight, is bent and fitted on a curved conveying belt along its outer circumference, strains tend to be generated near the joint between the resin moulding and the conveying belt and conditions of stresses are complex. To absorb such stresses, the resin moulding is required to have high flexibility. To cope with this problem, in the case of the deformed conveying belt shown in FIG. 8, the resin moulding is sewn onto the conveying belt to absorb stresses.

Moreover, these deformed conveying belts are required that their resin mouldings should have excellent wear resistance. The reason is that the resin mouldings will contact guide rollers or products. If their wear resistance is deficient, the resin mouldings will wear out and break.

The present invention was made in the light of these points, and its object is to increase the flexibility of the resin moulding so as to prevent it from being damaged by bending forces and the like and to increase the wear resistance of the resin moulding so as to prevent it from being damaged by wear through the use of so-called two-color moulding wherein two kinds of resin having different hardnesses are combined together, namely, a resin part of low hardness is welded and/or bonded to the conveying belt and a resin part of high hardness is made to contact articles such as guide rollers and products.

Means to Solve the Problems

To accomplish the above-mentioned object, the deformed conveying belt may be a deformed conveying belt comprising a conveying belt on which a resin moulding is fixed, said resin moulding comprising a body being welded and/or bonded to th conveying belt and a contacting part being made of a resin of which hardness is greater than that of the body and being combined with the surface of the body to contact an article.

When the resin moulding of this deformed conveying belt is subjected to bending forces or the like, as the body is formed of a resin of low hardness and has high flexibility, the resin moulding will be prevented from being damaged by deformation. When the resin moulding contacts an article, as the contacting part is formed of a resin of which hardness is higher than that of the body and has high wear resistance, the resin moulding will be prevented from being damaged by wear.

The deformed conveying belt may be a deformed conveying belt as described above wherein the conveying belt is formed into umbrella or a disk or an umbrella or a disk with a hole opened at the center thereof, and the resin moulding comprises a body being formed into a cone in section and being welded and/or bonded to the face and/or the tail of the conveying belt at the outer circumference rim of the conveying belt and a contacting part being made of a resin of which hardness is greater than that of the body and being combined with the surface of the slope of the body on the inner circumference side thereof to contact guide rollers.

When the resin moulding of this deformed conveying belt is subjected to bending forces or the like, as the body is formed of a resin of low hardness and has high flexibility, the resin moulding will be prevented from being damaged by deformation. When the resin moulding contacts guide rollers, as the contacting part is formed of a resin of which hardness is higher than that of the body and has high wear resistance, the resin moulding will be prevented from being damaged by wear.

The deformed conveying belt may be a deformed conveying belt as described above wherein the resin moulding comprises a body being formed into a cone in section, extending in the direction of width of the conveying belt and being welded and/or bonded to the conveying belt and a contacting part being made of a resin of which hardness is greater than that of the body and being combined with the surface of one of the slopes of the body to contact a product.

When the resin moulding of this deformed conveying belt is subjected to bending forces or the like, as the body is formed of a resin of low hardness and has high flexibility, the resin moulding will be prevented from being damaged by deformation. When the resin moulding contacts a product, as the contacting part is formed of a resin of which hardness is higher than that of the body and has high wear resistance, the resin moulding will be prevented from being damaged by wear.

Advantageously, the contacting part of the resin moulding is bonded on the surface of the body, preferably by coextrusion.

EMBODIMENTS OF THE INVENTION

Figure 1:
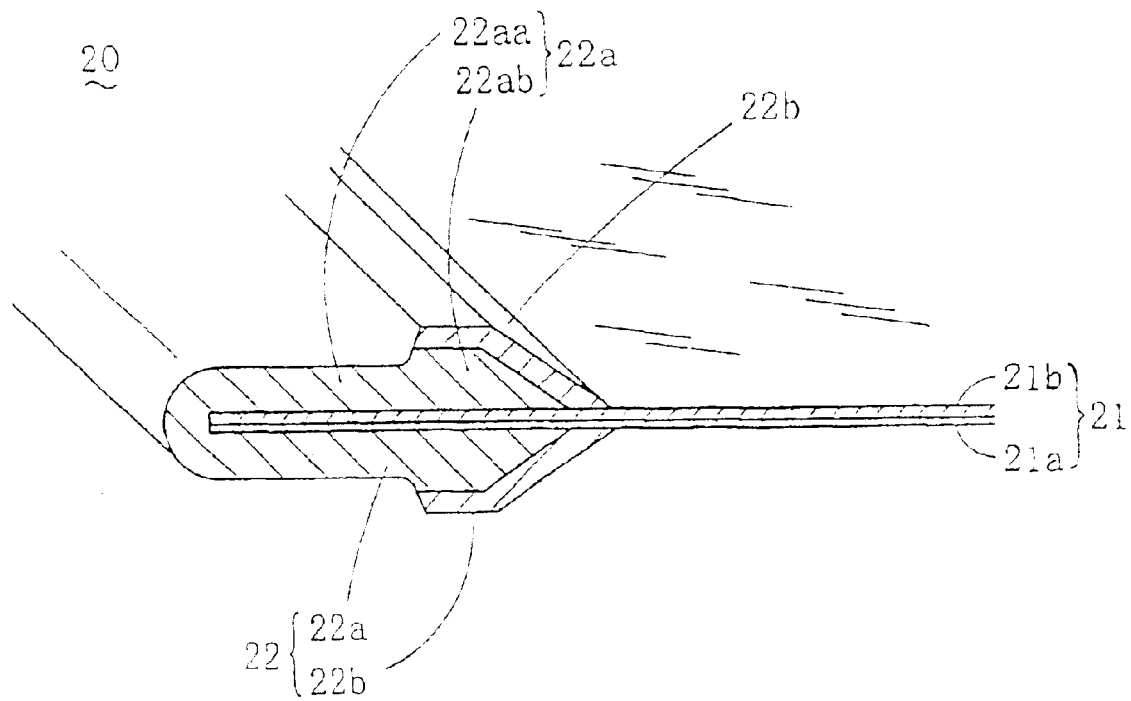
FIG. 1 is a perspective view showing the deformed conveying belt of a first embodiment. A portion of the belt near its outer circumference rim is sectioned and enlarged.
Figure 2:
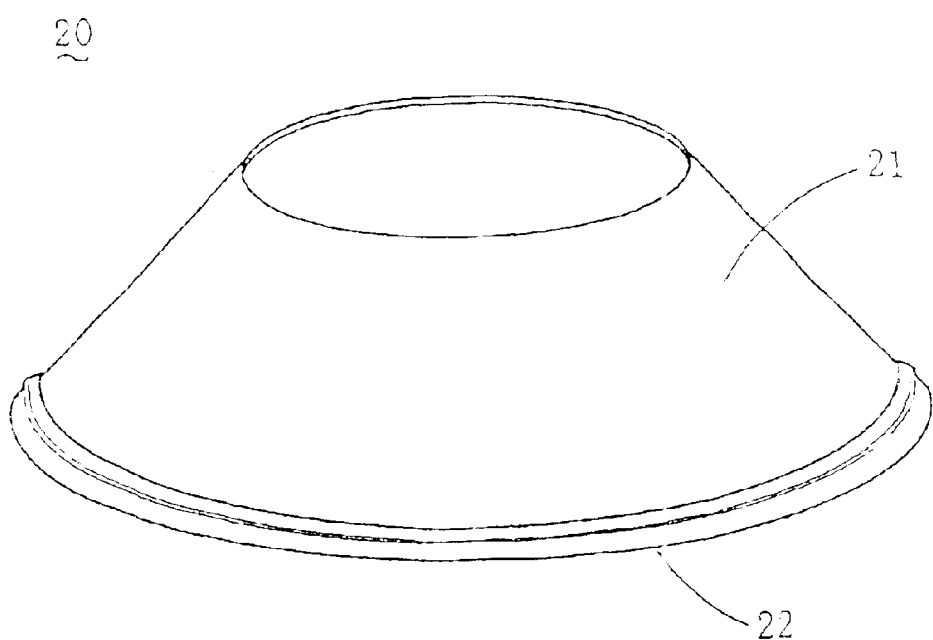
FIG. 2 is a perspective view showing the deformed conveying belt of the first embodiment. The belt is removed from the curved conveyor.
Figure 3:
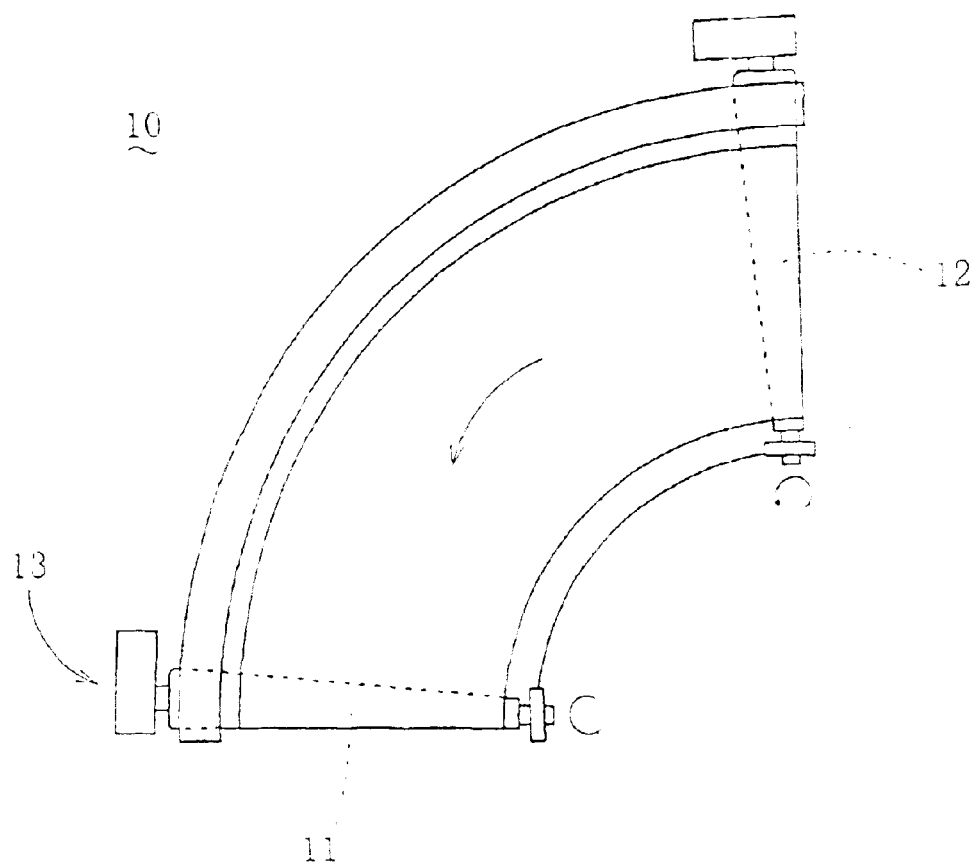
FIG. 3 is a plan view of the curved conveyor in which the deformed conveying belt of the first embodiment is fitted.
Figure 4:
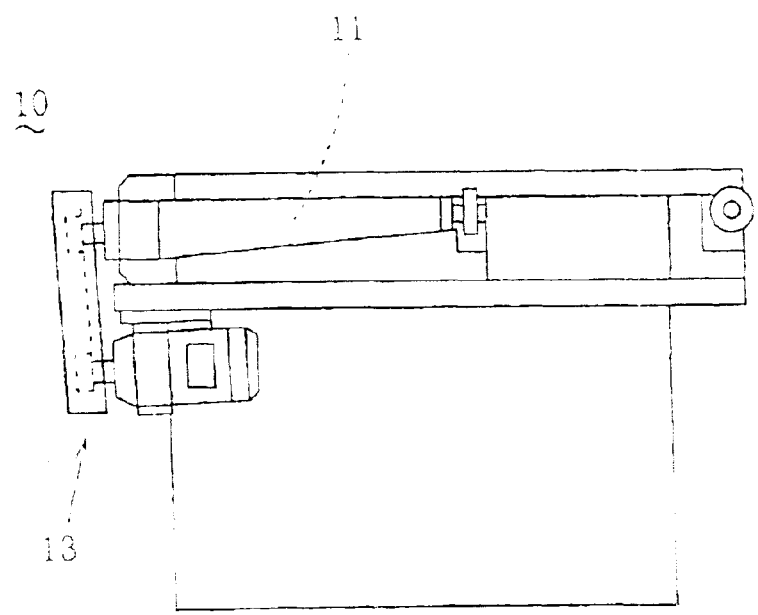
FIG. 4 is a front view of the curved conveyor in which the deformed conveying belt of the first embodiment is fitted.
Figure 5:
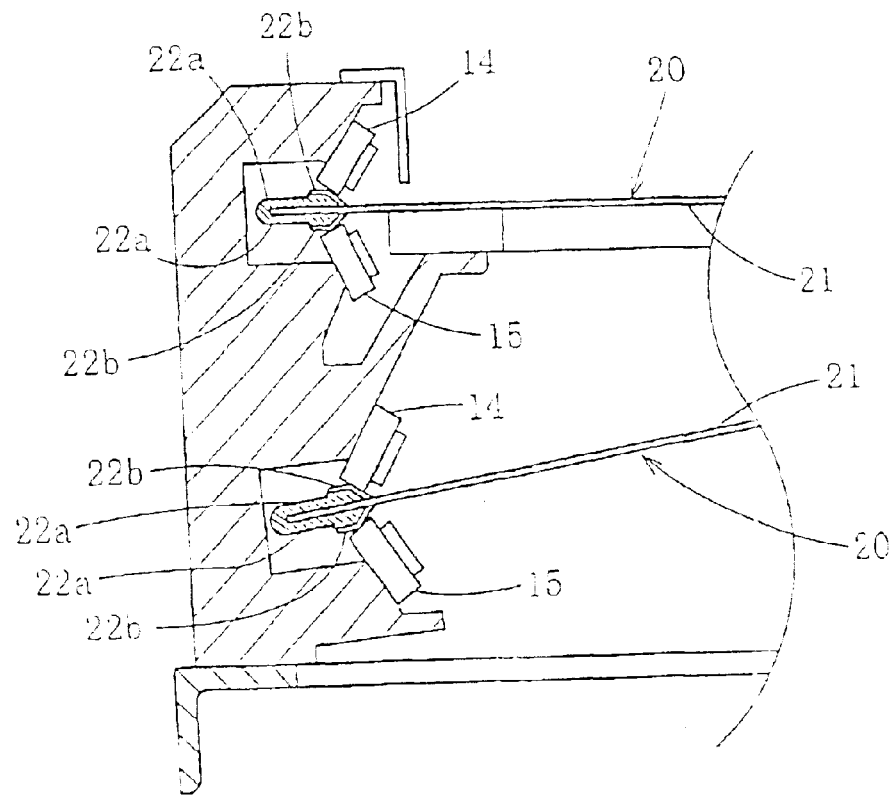
FIG. 5 is a partial enlarged vertical sectional view of the curved conveyor in which the deformed conveying belt of the first embodiment is fitted.

In the following some embodiments of the deformed conveying belt according to the present invention will be described. FIG. 1 and FIG. 2 show a deformed conveying belt 20 of the first embodiment. This deformed conveying belt 20 is used in a curved conveyor 10. In FIG. 3 through FIG. 5 showing this curved conveyor 10, 11 and 12 denote two conical or truncated-conical rollers which rotate on approximately horizontal axes. These rollers 11, 12 are arranged at an angle to each other to approximately form a V when seen in a plane. The deformed conveying belt 20 is put on these two rollers 11, 12. The conveying surface is curved when seen in a plane and is formed into a semi-circle. In the following, the center side of the direction of the radius of this semi-circle is referred to as the inner circumference side, and its opposite side is referred to as the outer circumference side. The outer circumference rim is the part which is most distant from the center in the radius direction. The rollers 11, 12 are turned by a driving force given by a driving mechanism 13 comprising, for example, a motor and a reduction gear, and in turn, the deformed conveying belt 20 rotates to advance the conveying surface. The curved conveyor 10 is provided with upper-side and lower-side guide rollers 14, 15 which contact the contacting part 22b of the deformed conveying belt 20. The guide rollers 14, 15 are provided on both the conveying side of the deformed conveying belt 20 and the returning side which is beneath the conveying side, and plural number of guide rollers are arranged on both sides at appropriate intervals along the circumference. As for the axes of rotation of the guide rollers 14, 15, if we suppose two perpendicular axes which extend upward and downward from the conveying surface, the axes of rotation of the guide rollers 14, 15 are these perpendicular axes or top ends of the axes of rotation of the guide rollers 14, 15 are tilted from these perpendicular axes towards the outer circumference side of the conveying surface by less than 90 degrees. With this arrangement, the circumferential faces of the guide rollers 14, 15 contact the contacting part 22b of the deformed conveying belt 20 from the inner circumference side to receive the force pulling the deformed conveying belt 20 towards the inner circumference side.

Figure 7:
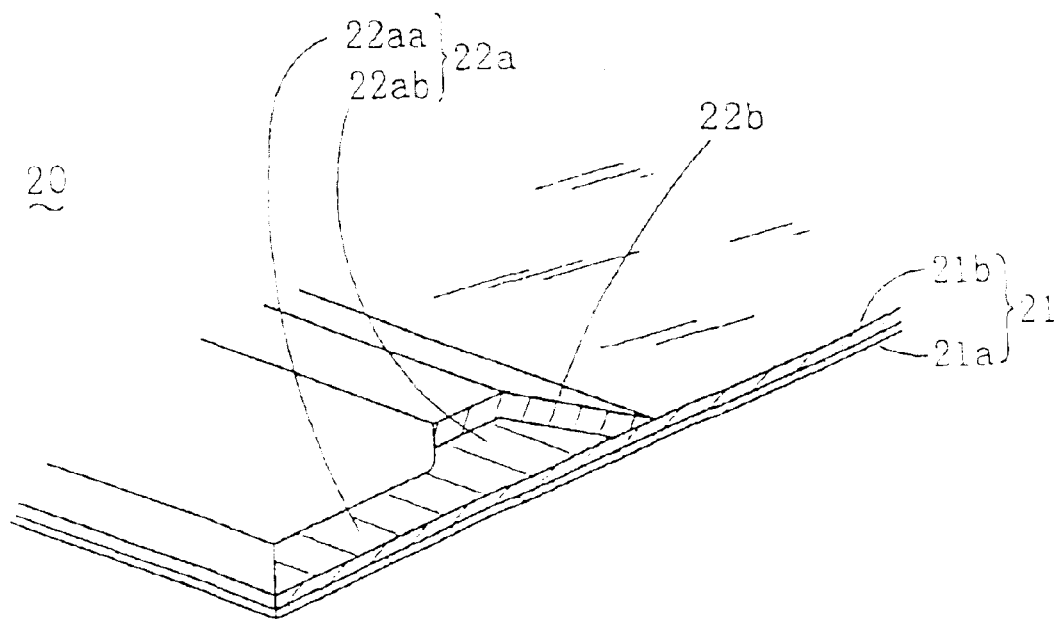
FIG. 7 is a perspective view showing a modification of the deformed conveying belt. A portion of the belt near the outer circumference rim is sectioned and magnified.
Figure 8:
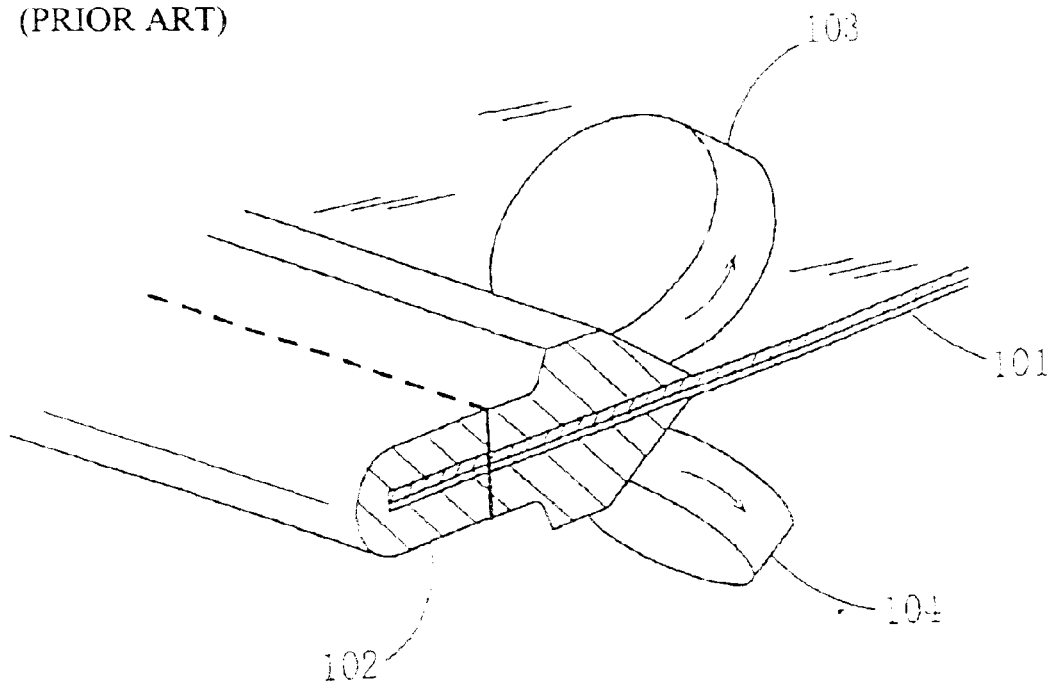
FIG. 8 is a view corresponding to FIG. 1 showing a related art.

As shown in FIG. 1, the deformed conveying belt 20 comprises a conveying belt 21 and a resin moulding 22 which is fixed onto the conveying belt 21. The resin moulding 22 comprises a body 22a which is formed of a resin of low hardness and welded and/or bonded to the conveying belt 21 and a contacting part 22b which is formed of a resin of which hardness is higher than that of the body 22a and is combined with the surface of the body 22a to contact an article. In this context being welded and/or bonded includes three modes, namely, being welded, being bonded, and being welded and bonded. As this first embodiment is the deformed conveying belt 20 which is used in the curved conveyor 10, as shown in FIG. 2, the conveying belt 21 is formed into an umbrella with a hole opened at the center thereof. The conveying belt may also be formed into an umbrella, a disk, or a disk with a hole opened at the center, and the present invention is applicable to these conveying belts. In that case, when the conveying belt is formed into a disk or a disk with a hole opened at the center, the rollers are normally formed into circular cylinders. And the resin moulding 22 is fixed continuously along the entire outer circumference rim of the conveying belt 21. The resin moulding 22 comprises the body 22a being made of the resin and formed into a cone in section and being welded and/or bonded to the face and the tail of the conveying belt 21 at the outer circumference rim thereof and the contacting part 22b being made of the resin of which hardness is greater than that of the body 22a and being combined with the surface of the slope of the body 22a on the inner circumference side to contact guide rollers 14, 15 being articles. The form of a cone in section means a configuration wherein there is a thicker portion in the middle in the direction of radius in section and slopes are formed on both sides of the thicker portion. The body 22a in this embodiment is formed into a cone in section, and when it is described in more detail, the body 22a comprises a flat outer part 22aa and an inner part 22ab which is continuous to the outer part 22aa on the inner side thereof and is thicker than the outer part 22aa, and the contacting part 22b of an approximately constant thickness is combined with the surface of the slope of the inner part 22ab on the inner circumference side. The present invention includes an embodiment wherein the body 22a is not, provided with this outer part 22aa, but it is more preferable to have the outer part 22aa because the outer part 22aa increases the force binding the body 22a to the conveying belt 21. In this first embodiment the body 22a is welded and/or bonded onto the face and the tail of the conveying belt 21 at the outer circumference rim thereof. However, as shown in FIG. 7, the present invention includes a modification wherein the body 22a is welded and/or bonded to only the face of the conveying belt 21 at the outer circumference rim thereof and a modification wherein the body 22a is welded and/or bonded to only the tail of the conveying belt 21 at the outer circumference rim thereof. The description that the body is welded and/or bonded to the face and/or the tail of the conveying belt at the outer circumference rim thereof is used because the present invention covers these modifications as well as the first embodiment. In this first embodiment, the face side portion of the body 22a and the tail side portion of the body 22a are formed integrally and the body 22a of both sides is bent in the middle and folded to sandwich the outer circumference rim of the conveying belt 21, but the body of the face side and the body of the tail side may be separated from each other.

The conveying belt 21 of this first embodiment comprises a substrate 21a of canvas and an additional layer 21b which is made of a thermoplastic resin and laminated on the surface of the substrate 21a, and the conveying surface is formed by this additional layer 21b. The canvas is made of, for example, a resin such as polyester. The thermoplastic resin includes, for example, polyurethane, polyvinyl chloride and polyolefine. The present invention covers single-layer or multiple-layer conveying belts as well as the above-mentioned two-layer conveying belts, and the materials of the conveying belt are not limited by the first embodiment.

The resin moulding 22 is formed of, for example, thermoplastic polyurethane, but its material is not particularly limited. When the material of the resin moulding 22 and the material of the conveying belt 21 are the same, they fit with each other and will hardly peel off. Thus it is desirable. The difference in hardness between the body 22a and the contacting part 22b is set appropriately according to, for example, the radii of rotation of the rollers 11, 12, and the contacting pressure of the guide rollers 14, 15. For instance, Shore A hardness of the body 22a is set at 70 and Shore A hardness of the contacting part 22b is set at 85.

Figure 6:
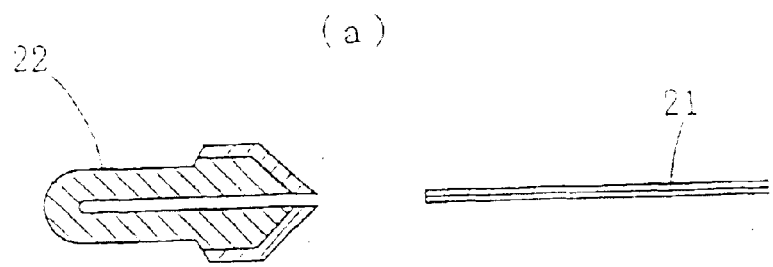
FIG. 6 is an enlarged vertical sectional view showing the production process of the deformed conveying belt of the first embodiment.
Figure 6:
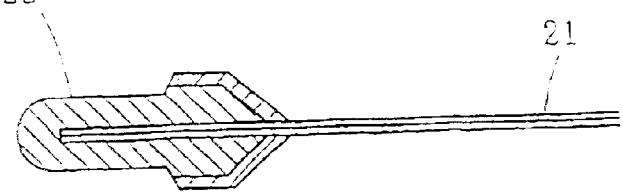

The deformed conveying belt 20 is produced by integrating the body 22a and the contacting part 22b to form the resin moulding 22 and then, as shown in FIG. 6(a), fitting the resin moulding 22 onto the conveying belt 21, and, as shown in FIG. 6(b), welding and/or bonding them together. Welding is effected by heating and cooling, and bonding is effected by applying an adhesive and drying. In the process, only the body 22a of the resin moulding 22 may be welded and/or bonded to the conveying belt 21, but depending on its configuration, a part of the contacting part 22b in addition to the body 22a may be welded and/or bonded to the conveying belt 21.

Accordingly, the deformed conveying belt 20 of the above-mentioned first embodiment can prevent the resin moulding 22 from being damaged by deformation when the resin moulding 22 is subjected to a bending force or the like because the body 22a is made of a resin of low hardness, and is very flexible. In particular, in the deformed conveying belt 20 of the first embodiment the resin moulding 22, which is formed straight, is bent and fit on the curved conveying belt 21 along its outer circumference rim, strains tend to be generated near the joint between the resin moulding 22 and the conveying belt 21 and conditions of stresses are complex. However, as the body 22a is made of a resin of low hardness and is very flexible, it can absorb such stresses to prevent the resin moulding 22 from being damaged by deformation and ensure stable running of the deformed conveying belt 20. Moreover, as the body 22a is very flexible and can prevent the resin moulding 22 from being damaged by deformation, the diameters of the rollers 11, 12 can be reduced as much as possible to compactify the curved conveyor 10. Even when the guide rollers 14, 15 contact the resin moulding 22, the resin moulding 22 is prevented from being damaged by friction because the contacting part 22b is formed of a resin of which hardness is greater than that of the body 22a and has high wear resistance. As a result, the circumferential faces of the guide rollers 14, 15 stably contact the contacting part 22b of the deformed conveying belt 20 to reliably receive the force pulling the deformed conveying belt 20 towards the inner circumference side.

When the resin moulding 22 is fixed onto the face and the tail of the conveying belt 21 at the outer circumference rim as is the case of the first embodiment, if the portions of both the face side and the tail side of the body 22a are formed integrally, the job of fitting the resin moulding 22 onto the conveying belt 21 in the production of the deformed conveying belt 20 will be easier, and workability will be improved.

Figure 9:
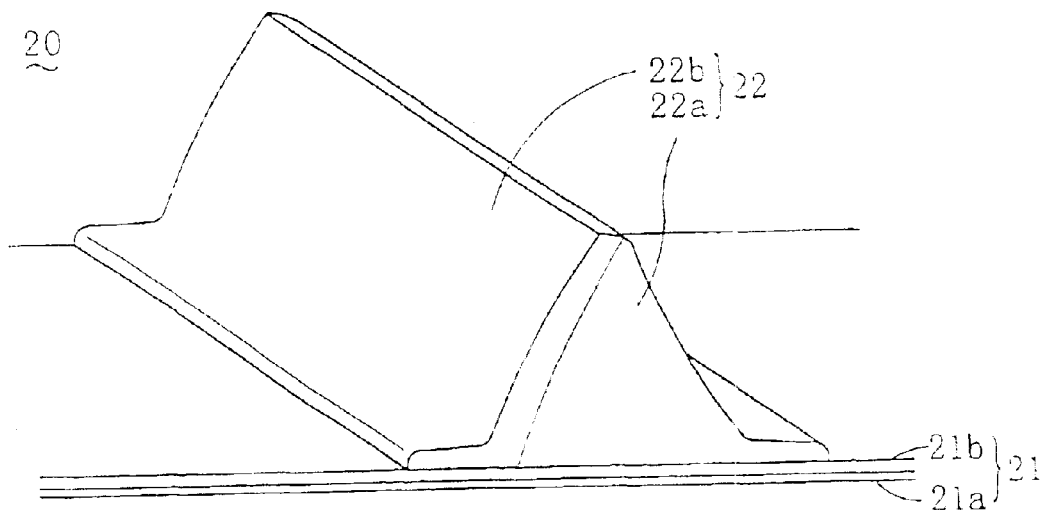
FIG. 9 is a perspective view showing the deformed conveying belt of a second embodiment.

FIG. 9 shows the second embodiment of the deformed conveying belt according to the present invention. In this deformed conveying belt 20, resin mouldings which extend in the width direction are provided as crossarms on the conveying surface thereof at approximately constant intervals in the longitudinal direction. When this deformed conveying belt 20 is put on rollers being arranged in parallel to each other and is turned, the crossarms will push and convey products being placed on the conveying surface.

As shown in FIG. 9, the deformed conveying belt 20 of the second embodiment comprises a conveying belt 21 on which resin mouldings 22 are fixed. The resin moulding 22 comprises a body 22a which is formed of a resin of low hardness and welded and/or bonded to the conveying belt 21 and a contacting part 22b which is formed of a resin of which hardness is higher than that of the body 22a and is combined with the surface of the body 22a to contact an article. In this context being welded and/or bonded includes three modes, namely, being welded, being bonded, and being welded and bonded. As the second embodiment is the deformed conveying belt 20 having crossarms, the resin moulding 22 comprises the body 22a being made of the resin and formed into a cone in section, extending in the width direction of the conveying belt 21 and being welded and/or bonded to the conveying belt 21 and the contacting part 22b being made of the resin of which hardness is greater than that of the body 22a and being combined with the surface of one of the slopes of the body 22a to contact a product (not illustrated in the diagram) being an article.

The conveying belt 21 of this second embodiment comprises a substrate 21a of canvas and an additional layer 21b which is made of a thermoplastic resin and laminated on the surface of the substrate 21a, and the conveying surface is formed by this additional layer 21b. The canvas is made of, for example, a resin such as polyester. The thermoplastic resin includes, for example, polyurethane, polyvinyl chloride and polyolefine. The present invention covers single-layer or multiple-layer conveying belts as well as the above-mentioned two-layer conveying belts, and the materials of the conveying belt are not limited by the second embodiment.

The resin moulding 22 is formed of, for example, thermoplastic polyurethane, but its material is not particularly limited. When the material of the resin moulding 22 and the material of the conveying belt 21 are the same, they fit with each other and will hardly peel off. Thus it is desirable. The difference in hardness between the body 22a and the contacting part 22b is set appropriately according to, for example, the radii of rotation of the rollers and the contacting pressure of the product. For instance, Shore A hardness of the body 22a is set at 70 and Shore A hardness of the contacting part 22b is set at 85.

Figure 10:
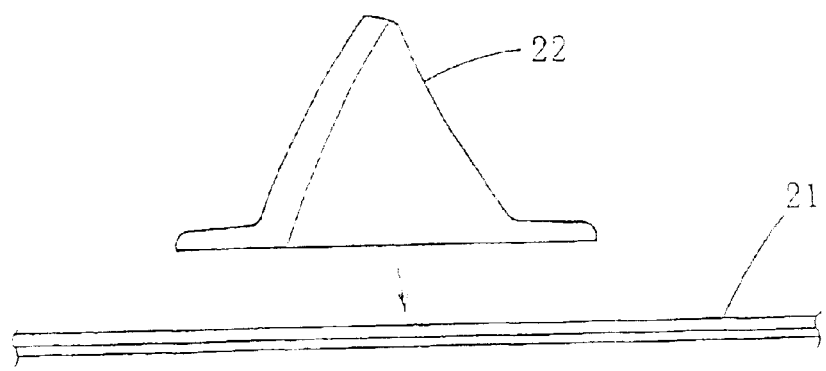
FIG. 10 is an enlarged vertical sectional view showing the production process of the deformed conveying belt of the second embodiment.
Figure 10:
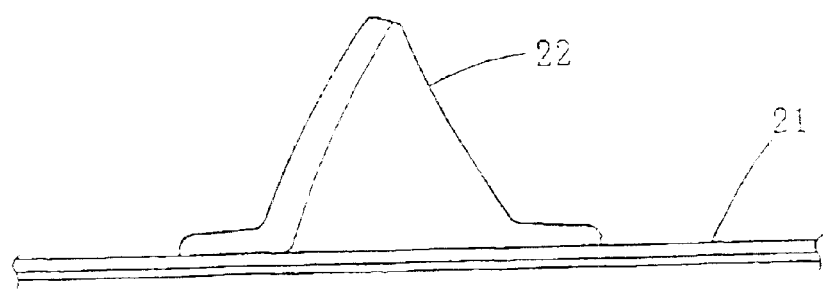

The deformed conveying belt 20 is produced by integrating the body 22a and the contacting part 22b to form the resin moulding 22 and then, as shown in FIG. 10(a), fitting the resin moulding 22 onto the conveying belt 21, and, as shown in FIG. 10(b), welding and/or bonding them together. Welding is effected by heating and cooling, and bonding is effected by applying an adhesive and drying. In the process, only the body 22a of the resin moulding 22 may be welded and/or bonded to the conveying belt 21, but depending on its configuration, a part of the contacting part 22b in addition to the body 22a may be welded and/or bonded to the conveying belt 21.

Accordingly, the deformed conveying belt 20 of the above-mentioned second embodiment can prevent the resin moulding 22 from being damaged by deformation when the resin moulding 22 is subjected to a bending force or the like because the body 22*a* is made of a resin of low hardness and is very flexible. Moreover, the diameters of the rollers can be reduced as much as possible to compactify the conveyor. Even when a product contacts the resin moulding 22, the resin moulding 22 will be prevented from being damaged by friction because the contacting part 22*b* is formed of a resin of which hardness is greater than that of the body 22*a* and has high wear resistance.

The present invention includes an embodiment which combines the features of the above-mentioned first and second embodiments. In this deformed conveying belt the conveying belt is formed into an umbrella or a disk or an umbrella or a disk having a hole at the center thereof, and the first resin moulding comprises a body which is formed into a cone in section and welded and/or bonded on the face and/or the tail of the conveying belt at the outer circumference rim thereof and a contacting part which is formed of a resin of which hardness is greater than that of the body and is combined with the surface of the slope of the body on the inner circumference side to contact guide rollers. Moreover, the second resin moulding is separately fixed on the conveying surface of this conveying belt. The second resin moulding comprises a body being formed into a cone in section, extending in the direction of width of the conveying belt and being welded and/or bonded to the conveying belt and a contacting part being made of a resin of which hardness is greater than that of the body and being combined with the surface of one of the slopes of the body to contact a product. This deformed conveying belt exhibits the actions and effects which are provided by both the first embodiment and the second embodiment.

What is claimed is:

1. A deformed conveying belt (20) comprising a conveying belt (21) on which a resin moulding (22) is fixed, said resin moulding (22) comprising a body (22*a*) being welded and/or bonded to the conveying belt (21) and a contacting part (22*b*) being made of a resin of which hardness is greater than that of the body (22*a*) and being combined with the surface of the body (22*a*) to contact an article.

2. A deformed conveying belt (20) according to claim 1, wherein conveying belt (21) is formed into an umbrella or a disk or an umbrella or a disk with a hole opened at the center thereof, the resin moulding (22) comprises a body (22*a*) being formed into a cone in section and being welded and/or bonded to the face and/or the tail of the conveying belt (21 at the outer circumferential rim of the conveying belt (21) and a contacting part (22*b*) being made of a resin of which hardness is greater than that of the body (22*a*) and being combined with the surface of the slope of the body (22*a*) on the inner circumference side to contact guide rollers.

3. A deformed conveying belt (20) according to claim 1, wherein th resin moulding (22) comprises a body (22*a*) being formed into a cone in section, extending in the direction of width of the conveying belt (21) and being welded and/or bonded to the conveying belt (21) and a contacting part (22*b*) being made of a resin of which hardness is greater than at of the body (22*a*) and being combined with one of the slopes of the body (22*a*) to contact a product.

4. A deformed conveying belt according to claim 2, wherein a further resin moulding comprises a body being formed into a cone in section, extending in the direction of width of the conveying belt and being welded and/or bonded to the conveying belt and a contacting part being made of a resin of which hardness is greater than that of the body and being combined with one of the slopes of the body to contact a product.

5. A deformed conveying belt according to claim 1, wherein the contacting part (22*b*) is bonded on the surface of the body (22*a*), preferably by coextrusion.

6. A deformed conveying belt according to claim 2, wherein the contacting part (22*b*) is bonded on the surface of the body (22*a*), preferably by coextrusion.

7. A deformed conveying belt according to claim 3, wherein the contacting part (22*b*) is bonded on the surface of the body (22*a*), preferably by coextrusion.

8. A deformed conveying belt according to claim 4, wherein the contacting part (22*b*) is bonded on the surface of the body (22*a*), preferably by coextrusion.

* * * * *